United States Patent [19]

Wieser-Linhart

[11] Patent Number: 4,964,885
[45] Date of Patent: Oct. 23, 1990

[54] METHOD OF CLEANING EXHAUST GAS OF DRYING PLANTS AND AN APPARATUS FOR IMPLEMENTING SUCH METHOD

[75] Inventor: Johannes Wieser-Linhart, Salzburg, Austria

[73] Assignee: Hydrotechnik GmbH, Austria

[21] Appl. No.: 393,738

[22] Filed: Aug. 15, 1989

[30] Foreign Application Priority Data

Aug. 26, 1988 [CH] Switzerland .................. 3176/88

[51] Int. Cl.$^5$ .................. B01D 53/14; B01D 53/32
[52] U.S. Cl. .................................................. 55/8; 55/9;
55/10; 55/11; 55/85; 55/89; 55/94; 55/122;
55/126; 55/135; 55/223; 55/228; 55/233
[58] Field of Search ........................ 55/8–11,
55/85, 89, 90, 93, 94, 122, 126, 135, 222, 223,
228, 233, 257.7, 258, 259

[56] References Cited

U.S. PATENT DOCUMENTS

| | | | |
|---|---|---|---|
| 4,750,916 | 6/1988 | Svensson | 55/9 X |
| 4,759,777 | 7/1988 | Balakrishnan et al. | 55/85 |
| 4,781,732 | 12/1988 | Wondrasch et al. | 55/10 |

Primary Examiner—Robert Spitzer
Attorney, Agent, or Firm—Diller, Ramik & Wight

[57] ABSTRACT

The dew point of the exhaust gas is firstly reduced to a value in the range of 60°–65° C. Thereafter the exhaust gas flows through a washing and condensing apparatus. A part of the prepurified condensate is recirculated in a loop for carrying out the latter-mentioned washing. Thereafter the gas flows through a wet-deep bed filter apparatus. The sprinkler apparatus belonging thereto is fed again by a partly purified liquid. A drying chamber follows the wet-deep bed filter apparatus. The gas is then finally purified in an electro-filter plant. The condensate in the washing and condensing apparatus, to which also the washing liquid stemming from the sprinkler apparatus of the wet-deep-filter apparatus is added, is fed to a flotation plant. This condensate-liquid mixture has an increased temperature such that a better working in the flotation plant is obtained. The liquid flows thereafter through a biological treatment plant, a repurification apparatus, a sand filter apparatus and finally through an ultrafiltration apparatus. Between the individual liquid treatment apparatuses and plants, respectively, a part of the liquid is branched off and is fed in a closed loop fashion back to other apparatuses or plants in order to carry out purifying or cleaning, respectively, functions thereat. This allows an extremely economical operation of the entire apparatus.

25 Claims, 1 Drawing Sheet

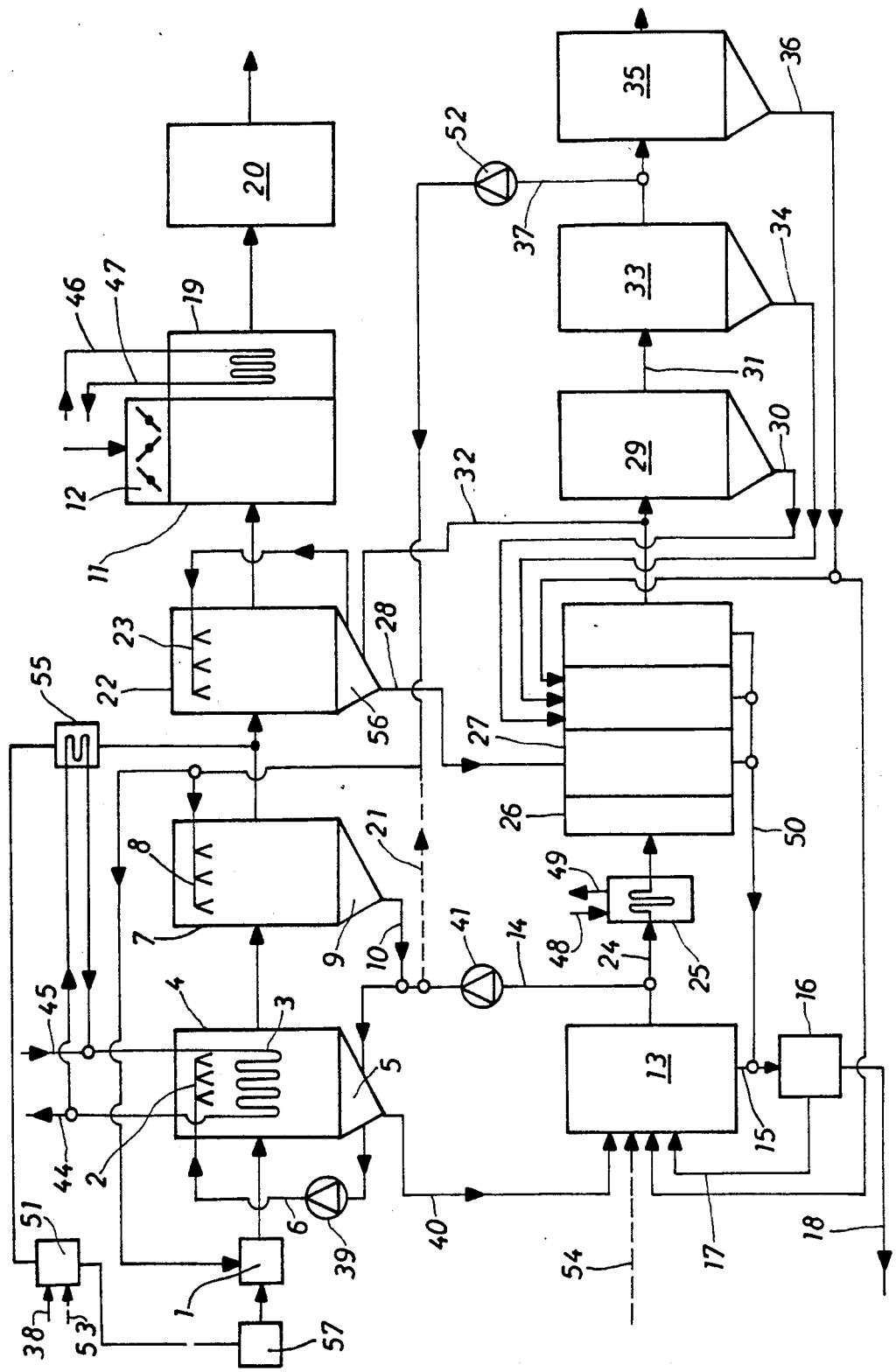

METHOD OF CLEANING EXHAUST GAS OF DRYING PLANTS AND AN APPARATUS FOR IMPLEMENTING SUCH METHOD

BACKGROUND OF THE INVENTION

1. Field of the Invention

The present invention relates to a method of cleaning exhaust gas. It relates further to an apparatus for cleaning the exhaust gas implementing such method.

2. Description of the Prior Art

Drying plants discharge in addition to dust and water vapor depending on the prevailing matter being dried also water vapor volatile, gaseous, organic substances together with the exhaust gas being produced and, furthermore, depending on the prevailing matter being dried also flue ash.

During the drying of wood chips in wood chip board plants, for instance, directly heated rotary dryers are used. In these dryers the moisture present in the matter to be dried is reduced from 30–120% to 2–5%. This exhaust gas contains in addition to solid matter and water vapor, a complex mixture of inorganic and organic non-air matter or substances, respectively.

Noteworthy is now the fact, that the organic substances are at least partly volatile, natural constituents of wood but, however, also further substances which are produced during the reducing of the wood substance during the processing thereof in chip board production plants. With regard to the quantity the most significant such substances are the terpenes, which are natural constituents of wood. It has been found, furthermore, that carbon acids, formaldehyde, methanol, phenol and cresols are contained in the exhaust gas.

A common procedure has been to clean or purify, respectively, such exhaust gas in cyclones, by means of which mean dust values of 100–200 mg/Nm$^3$ have been reached in the so-called purified gas, whereby, however, peak values can occur in a magnitude of 1000 mg/Nm$^3$. The exhaust gas temperature prevailing thereby amounts generally to 110°–130° C. and the content of water vapor 300–350 g/Nm$^3$. A separating and removing of the above mentioned organic and gaseous constituents has hardly been made until this date. Accordingly, the exhaust gas was still loaded with considerable amounts of dust and of organic, gaseous substances, which are termed in the art "blue smoke" as well as a considerable content of water vapor which is termed in the art as "white smoke".

SUMMARY OF THE INVENTION

It is, therefore, a general object of the present invention to provide a method, by means of which substances which are harmful to the environment can be reduced to a minimal amount. Furthermore, an economical purifying method having a high total thermal efficiency shall be provided. If the method is applied, for instance, for purifying and cleaning, respectively, of the exhaust gases generated in wood drying plants, those substances shall be able to be separated out of the exhaust gas which produce the so-called blue smoke and also the so-called white smoke.

A further object of the present invention is to provide a method of cleaning exhaust gas including the steps of lowering the dew point of the exhaust gas to a value in the range of 60°–85° C.; of cooling the exhaust gas by a heat exchanging to a value in the range of 20°–60° C. in order to cause a condensing of water vapor and further condensable matter contained in the exhaust gas and of simultaneously washing the exhaust gas being cooled by the condensate obtained by the condensing, which condensate is pre-purified and the pre-purified phase thereof recirculated for mentioned washing of the exhaust gas; of thereafter wetfiltering and washing the gas further by a recirculated liquid obtained from the condensate by a further purifying thereof; of admixing the liquid obtained by the washing to the condensate obtained by the condensing such that a condensate/washliquid mixture is produced; of finally drying the gas by a reheating thereof up to a temperature in the range of 40°–60° C.; and of subjecting the condensate/washliquid mixture to a flotation and of dewatering and burning the sediment phase obtained thereby and of feeding the gas produced by said burning back to the initial exhaust gas to be cleaned.

Yet a further object of the present invention is to provide an apparatus for cleaning exhaust gas which includes a moistening apparatus followed downstream relative to the gas flow by a washing and condensing apparatus operative to wash and cool the gas flowing therethrough and including a sprinkler apparatus, a cooling coil system and a sump designed as a coarse precipitator, which sump is in communication via a recirculation loop conduit for the coarse pre-purified condensate with the sprinkler apparatus; which washing and condensing apparatus is followed in turn downstream by a wet-deep bed filter apparatus having a further sprinkler apparatus and including a sump for collecting the sprinkled washing liquid, which sump is in communication via a recirculation conduit with the sump of mentioned washing and condensing apparatus; which washing and condensing apparatus is followed downstream by a drying chamber having a controllable drying air inlet; and having a flotation plant communicating at the inflow side with the sump of the washing and condensing apparatus and having an outlet for the liquid phase of the flotation treatment, from which a branch conduit is branched off, which extends for a recirculation back to the sump of the washing and condensing apparatus, and having a discharge conduit for the sediment phase of the flotation treatment which communicates with a dewatering device, of which the liquid phase outlet communicates via a return conduit with said flotation plant and which includes a sludge outlet arranged to communicate with the apparatus or system, respectively, in which the exhaust gas to be cleaned is generated.

BRIEF DESCRIPTION OF THE DRAWING

The present object will be better understood and objects other than those set forth above will become apparent when consideration is given to the following detailed description thereof. Such description makes reference to the annexed drawing, wherein:

The single figure illustrates schematically a circuit and flow chart of an apparatus operating in accordance with the inventive method.

DESCRIPTION OF THE PREFERRED EMBODIMENT

The exhaust gas which is e.g. fed from a drying plant or exhaust gas loaded by flue ash stemming from a burning of bio-substances is identified by the reference numeral 38.

In case of wood chip board production plants this exhaust gas 38 has flowed through a rotary dryer 51 and a dry separator apparatus 57 which operates with the exhaust temperature of the dryer 51. The dry separator apparatus 57 may be designed in accordance with known designs as cyclone, as a filter operating with a fabric or also as electro-filter. In certain wood chip board plants such a dry separator apparatus is integrated in the plant itself, and in case of such plants which have not such a dry separator the apparatus described hereinabove would be arranged prior to the plant being described hereinbelow. Furthermore, if the content on solid matter in the exhaust gas 38 stemming from the plant corresponds already to the desired or set, respectively, gas quality values, the dry separator apparatus would not be necessary.

The product obtained in such dry separator apparatus can be fed either to a further location utilizing this product or may be possibly led away and handled together with the flue ash which has been separated, too. Important is, however, that the exhaust gas being fed is dry.

The exhaust gas which is now to be treated flows initially into a moistening apparatus 1. In this moistening apparatus the dew point of the exhaust gas is controlled to a value of 60°–85° C. The liquid which is needed for this task is led from a treatment step further downstream such as illustrated in the drawing and the details thereto will be described as the description proceeds. It is, therefore, in this instance merely important to note that a liquid is fed into the moistening apparatus 1 stemming from a further location in the treatment plant. The exhaust gas flows thereafter out of the moistening apparatus 1 and into a washing and condensing apparatus 4. This washing and condensing apparatus 4 is designed as gas-air heat exchanger and/or gas-water heat exchanger and includes a sprinkler apparatus 2 or a cooling tower shaped injection cooler. The reference numeral 3 identifies the cooling coil system 3 needed for the condensing. In this washing and condensing apparatus 4 the temperature of the exhaust gas is lowered to a value in the range of 20°–40° C. The dew point of the exhaust gas amounts in this instance to about 60°–85° C. and due to mentioned cooling a much lower temperature prevails, such that quite obviously the water vapor and further substances which condense at this temperature range will condensate.

In case of a wood drying plant the exhaust gas contains e.g. terpentenes as organic main constituent, which substances condensate at a temperature in the range of 50°–70° C. and conclusively these substances appear at temperatures below 50° C. in the state of aerosols or then in the state of water droplets. A mixing of these substances with the water condensate occurs only to that extent, according to which the organic substances mix with the condensate or can be dissolved in the condensate. It is, however, to be noted that in this step terpenes, which, as generally known, are hydrophobious, are separated only partly, i.e. not completely such that a separating out of the organic liquid droplets in this process step, i.e. in the washing and condensing apparatus 4 is achieved only partly.

The condensate precipitated is collected in a sump 5, in which sump the accordingly obtained condensate is treated or retreated, respectively, in a circuit or loop 14, which will be described hereinbelow.

The treated condensate is led via a pump 39 and a recirculation loop conduit 6 to the sprinkler apparatus 2 of the washing and condensing apparatus 4. Accordingly, the treated condensate is used for purifying the exhaust gas flowing into the apparatus 4 in an economical manner. The condensate is led, furthermore, from the sump 5 via the conduit 40 to a flotation plant 13. A part of the quantity of the liquid phase obtained or produced in this flotation plant 13 is led back in order to allow mentioned treating of the condensate in the sump via a branch conduit 14 and a pump 41 and, as mentioned, back into the sump 5 of the washing and condensing apparatus 4. This favors or promotes, respectively, the adsorbing of the gas-water phase into the washing liquid. In case of a burning of bio-substances, for instance, the adsorption of the flue gas into the washing liquid is promoted.

In the flotation plant 13 a sludge-like sediment phase is produced or obtained, respectively, as is well-known. This sediment phase is led via the discharge conduit 15 to a dewatering device 16. The liquid phase produced in this dewatering device 16 is led back to the flotation plant 13 via a return conduit 17. On the other hand, the dewatered sludge which has been obtained in the dewatering device 16 is recirculated back via the sludge outlet conduit 18 to a burner plant or to that plant, respectively, in which the exhaust gas 38 has originally been or is being produced such that also here a closed loop circulation is achieved.

Quite obviously a certain heat quantity will become available due to the condensing in the washing and condensing apparatus 4, which heat quantity is further used for the economical operation. The cooling medium, which flows through the cooling coil system 3, may it be a liquid or a gas, is used on the one hand for heating purposes for the heating of water and air for general heating purposes at distant areas or then for heating purposes and warm water supply, respectively, of the plant proper, in which this cleaning plant or apparatus is installed. Whatever use is made of this heat transporting medium, the discharge conduit is identified by the reference numeral 44 and the feeding conduit (relative to the cooling coil system) by the reference numeral 45. As illustrated, further branches exist at the discharge and feeding, respectively, conduits, which will be explained later hereinbelow.

It is to be noted, furthermore, that in case of highly loaded exhaust gases, for instance, including a relative high amount of toxic or organic matter an additional adsorbing matter, such as e.g. charcoal or brown coal coke, respectively, is given into the washing and condensing apparatus 4, which additional adsorbing matter is also separated and removed during the floating treatment in the flotation plant 13.

The gas, which has now been cooled in the washing and condensing apparatus 4, contains now substantially only fine water droplets present in form of fog and also organic aerosols, because, as mentioned above, a separating of the organic liquid droplets in the washing and condensing apparatus 4 is not a complete separating. Accordingly, the washing and condensing apparatus 4 is followed downstream by an additional droplet separator in form of a wet-deep bed filter apparatus 7, which separates now these fine liquid droplets practically completely. This wet-deep bed filter apparatus 7 includes a further sprinkler apparatus 8. The return line 10 from the sump 9 of this filter apparatus 7 extends back into the sump 5 of the washing and condensing apparatus 4 such that the adsorption which has been referred to above is still further favored. The supply of the liquid to the sprinkler apparatus 8 can be chosen according various arrangements depending on the local conditions.

It shall be noted here that the upper half of the drawing illustrates the purifying or cleaning, respectively, of the gas phase and the lower half thereof the cleaning or purifying, respectively, of the liquid phase in the entire apparatus. If the individual units of the apparatus (e.g. 27, 29, 33, 35) for a treating of the liquid are located at a larger distance from that part of the apparatus or plant, respectively, in which the gas is treated, the sprinkler apparatus 8 is supplied with the corresponding liquid via branch conduit 14, pump 41 and branch conduit 21 from the outlet of the flotation plant 13. Such arrangement is, for instance, applicable if that part of the apparatus which purifies the liquid is due to a relatively small loading or final contamination of the liquid flowing out of the flotation plant 13, integrated in a community water purifying or cleaning, respectively, plant. If on the other hand the part of the apparatus, in which the liquid is treated, is located directly at or adjacent, respectively, the part in which the gas is treated, the feeding of the sprinkler apparatus 8 is accomplished through the branch conduit 37 such as will be described in detail further below.

A branch conduit branched off the outlet of the wet-deep bed filter apparatus 7 extends towards a heat exchanger 55 and from this heat exchanger 55 further to the initially described drying apparatus 51. Accordingly, the drying is accomplished economically by means of already purified gas. In order to heat this gas a heat quantity is utilized, which has been gained during the condensing step, for which reason branch lines are branched off the previously mentioned discharge conduit 44 and feeding conduit 45 of the cooling coil system 3.

Reference numeral 22 designates a bio-washing plant which is located downstream of the wet-deep bed filter apparatus, which bio-washing plant 22 includes a sprinkler apparatus 23.

This bio-washing plant is now an alternative embodiment which is not necessary in every case and accordingly not existing in every case. This plant is present when the exhaust gas includes a relatively high content of hydrocarbons, which remain in a gas dissolved state at low temperatures. The bio-washing plant 22 includes filler bodies of any kind of well-known designs such that an intensive contact between the washing liquid flowing out of the sprinkler apparatus 23 and the gas is secured which is here to be purified or cleaned, respectively, further.

The washing liquid exiting from the sump 56 of this bio-washing plant 22 is returned, i.e. recirculated in a loop to the sprinkler apparatus 23 thereof. Furthermore, an outlet conduit 28 runs to a biological treatment or purifying, respectively, plant 27, which will be explained more in detail further below and belongs to that part of the entire apparatus which purifies the respective liquids or liquid phases, respectively. To be noted here is that a recirculating conduit 32 extends from the outlet of the biological treatment plant 27 in a loop back to the sump 56 of the bio-washing plant 22 such that also here a closed loop-recirculation is present.

The gas which flows out of the bio-washing plant 22 flows through a drying chamber 11, in which it is dried. During the start-up phase of the entire plant fresh air, i.e. dry air, is blown in through the fresh or dry, respectively, air inlet 12. During the normal, continuous operation the gas is dried in the next following heating apparatus 19 and here exclusively by a temperature rise. The feeding line 46 and return line 47, respectively, of this heating apparatus 19 can communicate, for instance, with the feeding conduit 45 and discharge conduit 44, respectively, of the washing and condensing apparatus 4. The gas is brought in the drying chamber 11 together with the influence of the heating apparatus 19 to a moisture content which is optimal for the electro-filter plant 20 located next downstream seen in direction of the gas flow. In this electro-filter plant 20 a final, finest purifying of the gas is made, whereafter then this gas can be discharged into the atmosphere or environment, respectively, without presenting any kind of hazard to the environment, it can be considered now as clean gas.

Attention is now drawn, furthermore, specifically to the lower part of the drawing, in which all those parts of the apparatus are indicated which are used for the treatment of the liquids stemming specifically from the gas treating side of the apparatus.

Reference numeral 13 identifies a flotation plant 13, in which specifically a flotation treatment of the condensate-liquid mixture is carried out, which is fed thereto through the conduit 40 from the coarsely separating sump 5 of the washing and condensing apparatus 4. Preferably a flocculation agent is added to the flotation plant.

A part of the quantity of the liquid phase flowing out of this flotation plant 13 is fed, such as already mentioned, via the branch conduit 14 to the sump 5 of the washing and condensing apparatus 4 or, alternatively, via the further branch conduit 21 to the moistening apparatus 1 and to the sprinkler apparatus 8 of the wet-deep bed filter apparatus 7. The main quantity of the liquid flowing out of the flotation plant 13 flows firstly via conduit 24 through a cooling apparatus 25. The feeding conduit 48 and the return conduit 49, respectively, of this heating apparatus 25 can communicate, for instance, with the feeding and discharge, respectively, conduit 44, 45 of the washing and condensing apparatus 4. The object or operation, respectively, of this heating apparatus 25 is to bring the temperature of the liquid fed thereto to a value which is necessary for an optimal reduction or decomposition, respectively, in the biological treatment plant 27 which follows the heating apparatus 25, in which biological treatment plant 27 those substances which are in a dissolved state in water and can be decomposed are treated accordingly. This biological treatment plant 27 is designed in accordance with generally known such apparatuses. A surge basin 26 is arranged upstream of the biological treatment plant 27. By means of this surge basin 26 it is possible to reduce sudden changes of the properties of the liquid fed towards the biological treatment plant 27, specifically of the toxicity of the liquid such that no disturbances can occur in the biological treatment plant 27. The sludge outlet 50 of the biological treatment plant 27 runs towards the discharge conduit 15 of the flotation plant 13, via which the sludge exiting through the outlet 50 of the biological treatment plant 27 is recirculated back to the dewatering device 16 and returned in accordance with the recirculating conduits and loops mentioned above to the corresponding parts of the plant.

The liquid flowing out of the biological treatment plant 27 flows into a repurification apparatus 29, e.g. a flotation apparatus or a sedimentation basin. The sludge or contaminant phase, respectively, obtained in this repurification apparatus 29 flows via its outlet 30 again back to the biological treatment plant 27.

The main flow exiting out of the repurification apparatus 29 flows via conduit 31 into a sand filter apparatus 33. The outlet 34 of the contaminant phase of this sand filter apparatus 33 is also led back to the biological treatment plant 27. At the outlet of the sand filter apparatus 33 a further branch conduit 37 including a pump 42 52 is depicted in the figure, which branch conduit 37 extends on the one hand back to the wet-deep bed filter apparatus 7 and on the other hand back to the moistening apparatus 1. This branch conduit 37 is used then, when the part of the apparatus which handles the liquids obtained is located immediately or directly at the part of the apparatus handling the exhaust gas. In case, however, the treatment of the liquid phases or of the liquids, respectively, is made in a water purification plant of a community, i.e. if latter plant is located at a considerable distance from the part of the apparatus purifying the gas, the feeding thereof proceeds as mentioned earlier via the further branch conduit 21 originating at the flotation plant 13.

The final step of the treatment of the liquid is made in the ultrafiltration apparatus 35. The concentrate, i.e. again the contaminant phase, flowing out of its outlet 36 is recirculated back either to the biological treatment plant 27 or then to the flotation plant 13 depending on the fact, if this concentrate can be flocculated. The finally purified liquid flows thereafter from the ultrafiltration apparatus 35 into public waters.

Returning to the moistening apparatus 1 it can be seen in the drawing that in addition to the conduit 38, through which the exhaust gas 38 to be treated is fed therethrough, a further feeding conduit 53 is drawn with a broken line. This conduit 53 can be utilized for feeding further exhaust gases to the gas cleaning apparatus which stem e.g. from the oil heating and hot water production system of the chip board production plant as well as its office building. A further conduit 54 designed with broken lines extends to the flotation plant 13. Through this conduit 54 industrial waste waters or liquids, e.g. such from the office building mentioned as example above, may be fed for a purification thereof. This means, that the apparatus designed in accordance with the present invention is not only confined to an industrial purification but rather also for a purifying and cleaning of all exhaust gases and waste waters generated in a plant including its office building for a complete environmentally clean purification.

While there are shown and described present preferred embodiments of the invention, it is to be distinctly understood that the invention is not limited thereto, but may be otherwise variously embodied and practiced within the scope of the following claims.

I claim:

1. A method of cleaning exhaust gas, comprising the steps
    of lowering the dew point of the exhaust gas to a value in the range of 60°-85° C.;
    of cooling the exhaust gas by a heat exchanging to a value in the range of 20°-60° C. in order to cause a condensing of water vapor and further condensable matter contained in the exhaust gas and
    of simultaneously washing the exhaust gas being cooled by the condensate obtained by said condensing, which condensate is pre-purified and the pre-purified phase thereof recirculated for said washing of the exhaust gas;
    of thereafter wet-filtering and further washing the gas by a recirculated liquid obtained from said condensate by a further purifying thereof;
    of admixing the liquid obtained by said washing to the condensate obtained by said condensing such that a condensate/wash liquid mixture is produced;
    of finally drying the gas by a reheating thereof up to a temperature in the range of 40°-60° C. thereby producing reheated dried gas; and
    of subjecting said condensate/wash liquid mixture to a flotation and of dewatering and burning the sediment phase obtained thereby and of feeding the gas produced by said burning back to the initial exhaust gas to be cleaned.

2. The method of claim 1, comprising further the step of electro-filtering said reheated dried gas and thereafter exhausting said gas into the atmosphere, whereby the reheating is achieved by a part of the heat quantity obtained by said condensing step.

3. The method of claim 1, wherein the liquid obtained by said dewatering is recirculated back to said flotation step, and wherein a first part of the quantity of the liquid phase obtained in the flotation step is fed to the condensate obtained by said condensing step.

4. The method of claim 1, wherein a second part of the quantity of the liquid phase obtained in the flotation step is recirculated for a controlling of the dew point of the exhaust gas and for said further washing of the gas being wet-filtered.

5. The method of claim 1, wherein the exhaust gas includes hydrocarbons which remain in a gas dissolved state at low temperatures, in which the exhaust gas is made subject to a biological washing after said wet-filtering step and prior to said drying step, to which end a part of the washing liquid of the biological washing is recirculated in a closed loop and the remaining part is purified biologically and thereafter fed back to and mixed with the recirculating part of the washing liquid for continued closed loop circulation.

6. The method of claim 1, in which a main quantity of the liquid phase obtained by the flotation step is led through a heat exchanger and thereafter after expiration of a dwell time for an attenuating of sudden changes of its composition is subjected to a biological purifying whereby the sludge obtained thereby is dewatered together with the sediment phase obtained in the flotation step.

7. The method of claim 6, in which the biologically purified liquid is repurified and in which the contaminant phase separated thereby is recirculated to said main quantity of the liquid obtained by the flotation and being biologically purified.

8. The method of claim 7, wherein the exhaust gas includes hydrocarbons which remain in a gas dissolved state at low temperatures, in which the exhaust gas is made subject to a biological washing after said wet-filtering step and prior to said drying step, to which end a part of the washing liquid of the biological washing is recirculated in a closed loop and the remaining part purified biologically and thereafter fed back to and mixed with the recirculating part of the washing liquid for continued closed loop circulation, and in which a part of the liquid which has been biologically purified is recirculated for accomplishing said biological washing.

9. The method of claim 7, in which a another quantity of said purified liquid is sand filtered, and in which the contaminant phase which has been filtered out is recirculated to said main quantity, of the liquid obtained by the flotation and being biologically purified.

10. The method of claim 9, in which the liquid which has been sand-filtered is mad subject to an ultrafiltration, and in which the contaminant phase which has been filtered out thereby is also recirculated to said main quantity of the liquid phase obtained by the flotation and being biologically purified and/or is recirculated to the condensate/liquid mixture which is subjected to the flotation step.

11. The method of claim 10, in which a part of the sand-filtered liquid is recirculated for a controlling of the dew point of the exhaust gas and/or for the washing of the exhaust gas in the ccoling and washing step.

12. The method of claim 1, wherein the exhaust gas includes hydrocarbons which remain in a gas dissolved state at a low temperatures, in which the exhaust gas is made subject to a biological washing after said wet-filtering step and prior to said drying step, to which end a part of the washing liquid of the biological washing is recirculated in a closed loop and the remaining part is purified biologically and thereafter fed back to and mixed with the recirculating part of the washing liquid for continued closed loop circulation, the main quantity of the liquid phase obtained by the flotation step is led through a heat exchanger and thereafter after expiration of a dwell time for an attenuating of sudden changes of its composition is subjected to a biological purifying whereby the sludge obtained thereby is dewatered together with the sediment phase obtained in the flotation step, and the loading washing liquid stemming from the biological washing is subjected to said biological purifying together with said main quantity of the liquid obtained by said flotation.

13. The method of claim 1, comprising the step of drying and of removing dust from the exhaust gas prior to the cooling step by adding a heat quantity obtained by the condensing during the cooling step to a part of the wet-filtered gas, which part is then admixed to the exhaust gas to be dried.

14. An apparatus for cleaning exhaust gas, comprising a moistening apparatus followed downstream relative to the gas flow by a washing and condensing apparatus operative to wash and cool the gas flowing therethrough and including a sprinkler apparatus, a cooling coil system and a sump designed as a coarse precipitator, which sump is in communication via a recirculation loop conduit for the coarse pre-purified condensate with said sprinkler apparatus;

which washing and condensing apparatus is followed in turn downstream by a wet-deep bed filter apparatus having a further sprinkler apparatus and including a sump for collecting the sprinkled washing liquid, which sump is in communication via a recirculation conduit with the sump of said washing and condensing apparatus;

which washing and condensing apparatus is followed downstream by a drying chamber having a controllable drying air inlet;

and comprising a flotation plant communicating at the inflow side with the sump of said washing and condensing apparatus and having an outlet for the liquid phase of the flotation treatment, from which a branch conduit is branched off, which extends for a recirculation back to the sump of said washing and condensing apparatus, and having a discharge conduit for the sediment phase of the flotation treatment which communicates with a dewatering device of which the liquid phase outlet communicates via a return conduit with said flotation plant and which includes a sludge outlet arranged to communicate with the apparatus in which the exhaust gas to be cleaned is generated.

15. The apparatus of claim 14, in which a heating apparatus is allocated to said drying chamber, and in which the outlet of the heating apparatus is connected to an electro-filter plant.

16. The apparatus of claim 15, in which said heating apparatus communicates with regard to its heating medium with said cooling coil system of said washing and condensing apparatus.

17. The apparatus of claim 14, in which a further branch conduit is branched off said outlet for the liquid phase of the flotation treatment, which conduit extends in a first sub-branch to said moistening apparatus and in a second sub-branch to the sprinkler apparatus of said wet-deep bed filter apparatus.

18. The apparatus of claim 14, comprising further a bio-washing plant having filler bodies and including a sprinkler apparatus which is located regarding the gas flow between said wet-deep bed filter apparatus and said drying chamber.

19. The apparatus of claim 14, in which said flotation plant includes a main outflow conduit for the liquid phase produced, which main outflow conduit extends through a heating apparatus and thereafter to a surge basin of a biological treatment plant the outlet for the sludge produced therein communicating with said dewatering device.

20. The apparatus of claim 19, in which a bio-washing plant having filler bodies and including a sprinkler apparatus is located regarding the gas flow between said wet-deep bed filter apparatus and said drying apparatus, and in which said bio-washing plant includes a sump, from which the collected washing liquid is recirculated in a loop to its sprinkler apparatus, which sump is provided further with an outlet conduit extending to said biological treatment plant, and in that a branch conduit is branched off the outlet of the biological treatment plant which extends in a loop circuit like fashion back to the sump of said bio-washing plant.

21. The apparatus of claim 19, comprising further a repurificaticn apparatus located downstream of said biological treatment plant and having an outlet or the contaminant phase which communicates with the biological treatment plant.

22. The apparatus of claim 21, comprising further a sand filter apparatus located downstream of said repurification apparatus and having an outlet for the contaminant phase which communicates with the biological treatment plant.

23. The apparatus of claim 22, comprising further an ultrafiltration apparatus locate downstream of said sand filter apparatus and having an outlet for the contaminant phase which communicates with the biological treatment plant and/or with the flotation plant.

24. The apparatus of claim 23, comprising a branch conduit which is branched off the conduit extending from said sand filter apparatus to said ultrafiltration apparatus, which branch conduit extends to the wet-deep bed filter apparatus and/or the moistening apparatus.

25. The apparatus of claim 14, comprising a drying apparatus located relative to the gas flow upstream of said washing and condensing apparatus, a branch conduit branched off at the outlet of said wet-deep bed filter apparatus and extending via a heat exchanger to said drying apparatus, which heat exchanger communicates regarding the heat supply with the feeding and discharge, respectively, conduit of the cooling medium of the cooling coil system of said washing and condensing apparatus.

* * * * *